(12) United States Patent
Russell

(10) Patent No.: US 6,426,928 B1
(45) Date of Patent: Jul. 30, 2002

(54) ABILITY TO DISTINGUISH TRUE DISK WRITE ERRORS

(75) Inventor: Barry Lowell Russell, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/283,366

(22) Filed: Mar. 31, 1999

(51) Int. Cl.[7] .................................................. G11B 7/00
(52) U.S. Cl. ............................... 369/53.15; 369/53.17; 369/47.14
(58) Field of Search ........................... 369/53.15, 53.17, 369/47.14, 53.13, 53.36, 53.42, 44.321; 714/710, 769, 704, 723, 54; 360/49, 39, 54, 53, 48; 365/200, 201

(56) References Cited

U.S. PATENT DOCUMENTS

| | | |
|---|---|---|
| 3,771,143 A | 11/1973 | Taylor |
| 4,434,487 A | 2/1984 | Rubinson et al. |
| 4,525,839 A | 7/1985 | Nozawa et al. ................ 371/38 |
| 4,656,532 A | 4/1987 | Greenberg et al. ............ 360/48 |
| 4,907,226 A | 3/1990 | Endo ......................... 371/10.1 |

(List continued on next page.)

OTHER PUBLICATIONS

Enhancement to the Dynamic Alternate Assignment of Disk Sectors, IBM Technical Disclosure Bulletin, vol. 26, No. 11, Apr. 1984, pp. 6118–6119.

Effective Management Method of Spare Area Allocation for Sector and Cylinder Defects, IBM Technical Disclosure Bulletin, vol. 38, No. 5, May 1995, p. 141.

Blind Head Scrub Error Recovery Procedure for Magnetic Tape Subsystem, IBM Technical Disclosure Bulletin, vol. 35, No. 3, Aug. 1992, pp. 408–409.

(List continued on next page.)

*Primary Examiner*—William Korzuch
*Assistant Examiner*—Kim-Kwok Chu
(74) *Attorney, Agent, or Firm*—Jeffrey S. LaBaw; Bracewell & Patterson, L.L.P.

(57) ABSTRACT

If necessary, problematic sectors are isolated when an attempt to write a group of data blocks to corresponding disk sectors returns a write error by attempting to write each data sector individually, registering each individual sector which returns a write error for separate, further examination. Since disk drive vendors do not employ consistent write error messages in device drivers, true write faults—those caused by failure of disk media such that a sector becomes unreliable or unrecoverable—are then identified by an operating system device manager for the disk drive by writing the data block to a reserved replacement sector and monitoring the status of that write. If the write to the replacement sector also fails with a write error, the error signaled likely indicates a true drive status and an appropriate error is returned to the file system which issued the write request. If the write to the replacement sector succeeds, however, the write error most likely reflects a failing sector. Relocation of the failing sector may then be completed by simply mapping the original data sector to the replacement sector, and marking the original data sector as bad.

18 Claims, 4 Drawing Sheets

U.S. PATENT DOCUMENTS

| | | | |
|---|---|---|---|
| 5,075,804 A | | 12/1991 | Deyring |
| 5,088,081 A | | 2/1992 | Farr |
| 5,105,427 A | * | 4/1992 | Ando ......................... 714/769 |
| 5,166,936 A | | 11/1992 | Ewert et al. |
| 5,189,566 A | | 2/1993 | Christensen et al. |
| 5,253,256 A | | 10/1993 | Oyama et al. |
| 5,287,363 A | | 2/1994 | Wolf et al. ................. 371/21.1 |
| 5,313,626 A | | 5/1994 | Jones et al. |
| 5,420,730 A | | 5/1995 | Moon et al. |
| 5,422,890 A | * | 6/1995 | Klingsporn et al. ........ 714/723 |
| 5,437,020 A | | 7/1995 | Wells et al. |
| 5,452,147 A | | 9/1995 | Yamashita et al. ............ 360/46 |
| 5,473,753 A | | 12/1995 | Wells et al. ........... 395/182.03 |
| 5,506,977 A | | 4/1996 | Jones |
| 5,513,160 A | * | 4/1996 | Satoh et al. ............. 369/47.14 |
| 5,581,722 A | | 12/1996 | Welland |
| 5,588,007 A | | 12/1996 | Ma |
| 5,600,662 A | | 2/1997 | Zook |
| 5,615,190 A | | 3/1997 | Best et al. |
| 5,619,723 A | | 4/1997 | Jones et al. |
| 5,632,012 A | | 5/1997 | Belsan et al. |
| 5,633,767 A | | 5/1997 | Boutaghou et al. |
| 5,666,335 A | * | 9/1997 | Horibe .................... 369/53.36 |
| 5,701,220 A | | 12/1997 | Koriyama |
| 5,734,816 A | | 3/1998 | Niijima et al. |
| 5,740,349 A | | 4/1998 | Hasbun et al. |
| 5,742,934 A | | 4/1998 | Shinohara |
| 5,745,326 A | | 4/1998 | Koriyama |
| 5,751,733 A | | 5/1998 | Glover |
| 5,751,947 A | * | 5/1998 | Arakawa ..................... 714/54 |
| 5,764,881 A | | 6/1998 | Yoshida |
| 5,778,167 A | | 7/1998 | Carrel et al. |
| 5,793,559 A | | 8/1998 | Shepherd et al. ........ 360/78.09 |
| 5,828,511 A | | 10/1998 | Bar |
| 5,841,600 A | | 11/1998 | Kaplan ......................... 360/48 |
| 5,914,928 A | * | 6/1999 | Takahashi ................ 369/47.14 |
| 5,937,435 A | | 8/1999 | Dobbek et al. |
| 5,941,998 A | | 8/1999 | Tillson |
| 6,034,831 A | * | 3/2000 | Dobbek et al. ............... 360/53 |
| 6,043,945 A | | 3/2000 | Tsuboi et al. |
| 6,101,619 A | | 8/2000 | Shin |

OTHER PUBLICATIONS

Automatic Swap of the Primary and Secondary Mirros in a Disk Mirror System, IBM Technical Disclosure Bulletin, vol. 36, No. 12, Dec. 1993, pp. 85–86.

Write Retry Success Sector Verification in Error Recovery Steps, IBM Technical Disclosure Bulletin, vol. 38, No. 12, Dec. 1995, p. 45.

Retry Success Sector Read Verification in Idle Mode, IBM Technical Disclosure Bulletin, vol. 38, No. 12, Dec. 1995, p. 433.

Raid with Automatic Defect Detection and Correction Functions, IBM Technical Disclosure Bulletin, vol. 38, No. 2, Feb. 1996, pp. 327–328.

Easy Implementation of Post Write Error Retry, IBM Technical Disclosure Bulletin, vol. 39, No. 02, Feb. 1996, pp. 379–380.

Enhanced RAID–5 Error Recovery in Response to Drive Hard Read Errors, Research Disclosure, Jul. 1998, pp. 964–965.

Reassign Technique Utilizing Mapped Defect Information, Research Disclosure, Jul. 1998, p. 973.

* cited by examiner

ABILITY TO DISTINGUISH TRUE DISK WRITE ERRORS

RELATED APPLICATION

The present invention is related to the subject matter of the following commonly assigned, copending U.S. patent applications: Ser. No. 09/283,365 entitled "RELOCATING UNRELIABLE DISK SECTORS WHEN ENCOUNTERING DISK DRIVE READ ERRORS WITH NOTIFICATION TO USER WHEN DATA IS BAD" and filed Mar. 31, 1999; Ser. No. 09/283,364 entitled "RECOVERING AND RELOCATING UNRELIABLE SECTORS WHEN ENCOUNTERING DISK DRIVE READ ERRORS" and filed Mar. 31, 1999; and Ser. No. 09/282,873 entitled "RELOCATING SECTORS WHEN DISK DRIVE DOES NOT RETURN DISK WRITE ERRORS" and filed Mar. 31, 1999. The content of the above-referenced applications is incorporated herein by reference.

BACKGROUND OF THE INVENTION

1. Technical Field

The present invention relates in general to data storage on disk storage media and in particular to error handling and recovery for disk storage media. Still more particularly, the present invention relates to distinguishing true write errors during error handling and recovery for disk storage media.

2. Description of the Related Art

Accurate and prompt reporting of write errors or faults a disk drive by device drivers, adapters, and/or disk drives when an attempted write to the hard disk drive is unsuccessful represents the ideal situation for data protection. Under these conditions, the system or user application has an opportunity to preserve the data by writing it elsewhere. In particular, write faults indicating failure of an attempted write to a disk sector—which is indicative, in turn, of the unreliability of that disk sector—must be accurate for the operating system to preserve the user data.

However, there exist no standard means for reporting a write error due to sector failure to the operating system.

Different device drivers from various vendors will report different errors for this circumstance, ranging from the preferable write fault to a totally unreliable "drive malfunction" error. With this array of error reporting seen by the operating system, there is a need for an effective mechanism allowing the operating system to distinguish between true write faults from other errors which might be returned.

It would be desirable, therefore, to provide mechanism for distinguishing true write faults, resulting from disk sector failure, from other errors which might be returned during an attempted write to disk storage.

SUMMARY OF THE INVENTION

It is therefore one object of the present invention to provide improved data storage on disk storage media.

It is another object of the present invention to provide improved error handling and recovery for disk storage media.

It is yet another object of the present invention to provide a mechanism for distinguishing true write errors during error handling and recovery for disk storage media.

The foregoing objects are achieved as is now described. If necessary, problematic sectors are isolated when an attempt to write a group of data blocks to corresponding disk sectors returns a write error by attempting to write each data sector individually, registering each individual sector which returns a write error for separate, further examination. Since disk drive vendors do not employ consistent write error messages in device drivers, true write faults—those caused by failure of disk media such that a sector becomes unreliable or unrecoverable—are then identified by an operating system device manager for the disk drive by writing the data block to a reserved replacement sector and monitoring the status of that write. If the write to the replacement sector also fails with a write error, the error signaled likely indicates a true drive status and an appropriate error is returned to the file system which issued the write request. If the write to the replacement sector succeeds, however, the write error most likely reflects a failing sector. Relocation of the failing may then be completed by simply mapping the original data sector to the replacement sector, and marking the original data sector as bad.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
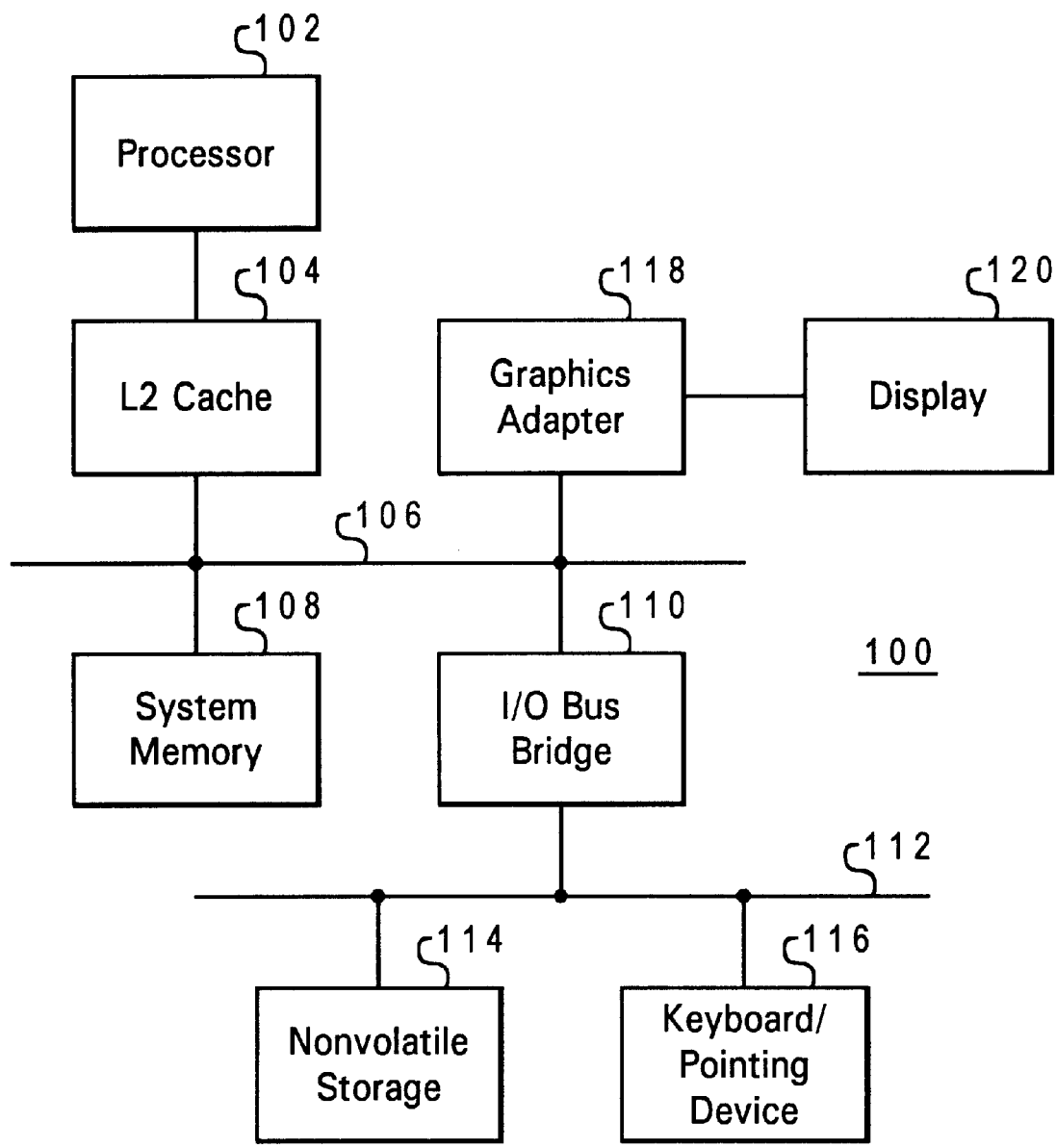
FIG. 1 depicts a block diagram of a data processing system and network in which a preferred embodiment of the present invention may be implemented.

With reference now to the figures, and in particular with reference to FIG. 1, a block diagram of a data processing system and network in which a preferred embodiment of the present invention may be implemented is depicted. Data processing system 100 may be, for example, one of the models of personal computers available from International Business Machines Corporation of Armonk, N.Y. Data processing system 100 includes a processor 102, which in the exemplary embodiment is connected to a level two (L2) cache 104, connected in turn to a system bus 106. In the exemplary embodiment, data processing system 100 includes graphics adapter 116 also connected to system bus 106, receiving user interface information for display 120.

Also connected to system bus 106 is system memory 108 and input/output (I/O) bus bridge 110. I/O bus bridge 110 couples I/O bus 112 to system bus 106, relaying and/or transforming data transactions from one bus to the other. Peripheral devices such as nonvolatile storage 114, which may be a hard disk drive, and keyboard/pointing device 116, which may include a conventional mouse, a trackball, or the like, are connected to I/O bus 112.

The exemplary embodiment shown in FIG. 1 is provided solely for the purposes of explaining the invention and those skilled in the art will recognize that numerous variations are possible, both in form and function. For instance, data processing system 100 might also include a compact disk read-only memory (CD-ROM) or digital video disk (DVD) drive, a sound card and audio speakers, and numerous other optional components. All such variations are believed to be within the spirit and scope of the present invention. However, data processing system 100 is preferably programmed to provide a mechanism for distinguishing true write faults caused by disk sector failure from other possible write errors.

Figure 2:
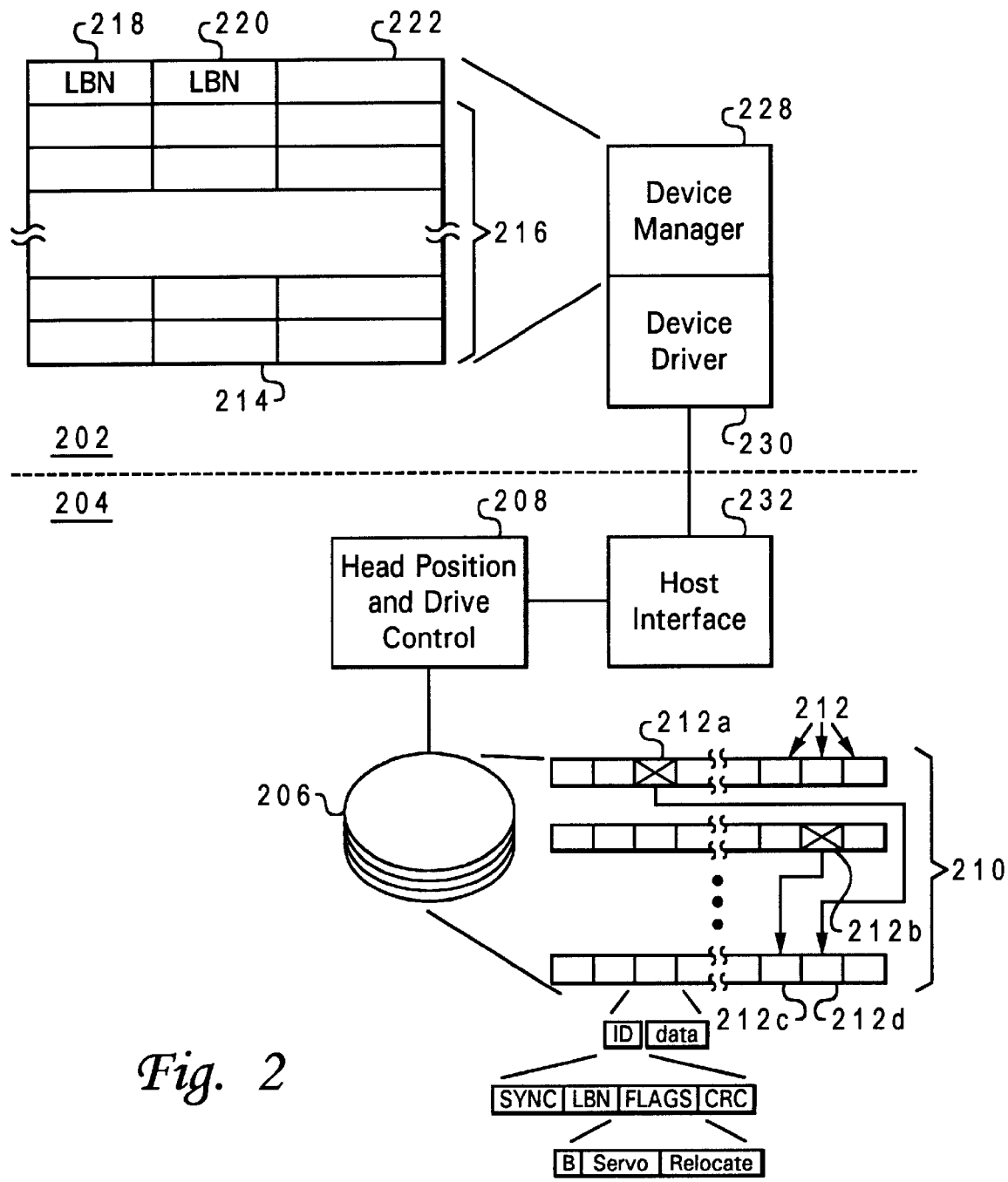
FIG. 2 is a diagram of a mechanism for distinguishing true write faults caused by unreliable disk sectors from other write errors in accordance with a preferred embodiment of the present invention.

Referring to FIG. 2, a diagram of a mechanism for distinguishing true write faults caused by unreliable disk sectors from other write errors in accordance with a preferred embodiment of the present invention is illustrated. The mechanism includes a host system 202, which may be data processing system 100 depicted in FIG. 1, and disk storage 204, such as nonvolatile storage 114 depicted in FIG. 1.

Disk storage 204 includes storage media 206, which is generally several magnetic storage disks spaced apart along a common central axis. In accordance with the known art, data is written to and read from storage media 206 by heads (not shown) positioned near storage media 206 as the disks are rotated by a drive motor (also not shown), with a separate head associated with each disk within storage media 206. The heads are moved in tandem over the surface of each respective disk within storage media 206, with the rotation of the disks and the position of the heads along a radius from the common axis controlled by head position and drive control logic 208.

Storage media 206 is logically divided into a number of tracks 210, which are generally arranged in concentric circles on the surface of the disks forming storage media 206. Each track 210 usually includes servo fields containing positioning information used to locate the head over a specific track, identification and synchronization fields, a data region, and error correcting codes (ECC). Because the servo, identification, synchronization, and ECC fields are not utilized by the present invention, only data regions for tracks 210 are illustrated in FIG. 2 for simplicity.

The data portion of each track is divided into a number of data sectors 212 (also referred to a "blocks") of a predetermined size and format. In the standard format, each sector 212 typically includes an identification (ID) field and a data field. Identification fields, in turn, generally include a synchronization field required for reading the data, a logical block number (LBN) assigned to the sector and employed by the addressing scheme of host system 202 to identify the sector, flags, and a cyclic redundancy check (CRC) character or similar error correcting codes (ECC). The flags may include a flag ("B") indicating whether the sector is good or bad, sector servo split flags, and a relocate pointer.

A defect map table 214, which may be maintained by storage media 204 and/or the operating system for host system 202, contains entries 216 for each LBN 218 assigned to an unrecoverable or unreliable sector which has been relocated. Until an unrecoverable or unreliable sector is identified and relocated for storage media 204, defect map table 214 will contain no entries. As unrecoverable or unreliable sectors are identified over the life of storage media 204, entries are added to defect map table 214. When unrecoverable or unreliable sector is identified, the failed sector is mapped within defect map table 214 to a replacement sector previously reserved by the operating system for host system 202. Each entry 216 thus contains the LBN 220 which addresses a previously reserved replacement sector. Entries are preferably indexed by the LBN 218 for disk sectors which have been relocated, and may also contain a flag as well as other information 222 about the sector identified by LBN 218 within an entry 216.

Unreliable or unrecoverable sectors may be identified by write faults, indicating that the media within the target sector for the write operation is defective. When an unreliable or unrecoverable sector such as sector 212a or 212b is identified during operation, the sector is remapped to a reserved spare or replacement sector 212c or 212d. The LBN 218 corresponding to the unreliable sector 212a or 212b is mapped to the LBN 220 of the corresponding replacement sector 212c or 212d, which may also be stored in the relocate pointer portion of an ID field for the appropriate unreliable sector 212a or 212b.

All disk drive device drivers can detect and report a bad data write to the disk media. Thus, a read request being handled by an operating system component 228 for storage disk 204 (often referred to as a "device manager" for disk 204) may encounter a write error returned from the device driver 230 for storage media 204, which receives the write error from host interface 232 of storage disk 204. As previously noted, however, write error reporting is not standardized or consistent among various manufacturers and/or models of disk storage devices. the present invention, therefore, when any error is returned to the operating system of host 202 while writing a group of data blocks to corresponding disk sectors, the device manager 228 will first isolate problematic sectors by writing each data block to the corresponding sector individually, and tracking the write errors returned, which signal that the sector may be defective. Each sector within the group being written to which results in a write error is then separately treated.

When writing only one sector for an input/output (I/O) operation which results in a write error, and particularly when receiving a nebulous "drive malfunction" error signal, device manager 228 distinguishes true write faults caused by failing disk sectors from other possible errors by writing the sector data to a pretested, operating system-reserved replacement sector. Thus, a write error returned for an attempted write to sector 212a would initiate a write of the same data block to sector 212d, a reserved replacement sector.

The status of the write to the replacement sector is employed to distinguish between write faults prompted by defective disk media and other write errors. If the write to the replacement sector also fails with an error, the error returned is, in all probability, a true indication of the drive state (even if a "drive malfunction" error is returned). Device manager 228 may return an appropriate error to the file system which issued the write request. If the write to the replacement sector succeeds, however, there is a good probability that the error was a true write fault indicative of an unreliable or unrecoverable disk sector. At this point, all that need be done to relocated the failing sector is create an entry in defect map table 214 for sector 212a, mapping the LBN for sector 212a to the LBN for sector 212d. The "bad" bit within sector 212a may also be set.

When subsequent reads or writes are performed to a file containing a sector relocated due to unreliability, the operating system checks the LBNs of the sectors to be read against defect map table 214. If an entry containing an LBN 216 to be read or written is found, the replacement sector 212d is read instead of failing sector 212a. Failing sector 212a is no longer employed to hold data. Replacement sector 212d thus becomes a fully functional substitute for failed sector 212a which it replaced, and the original data is preserved from loss.

Figure 3:
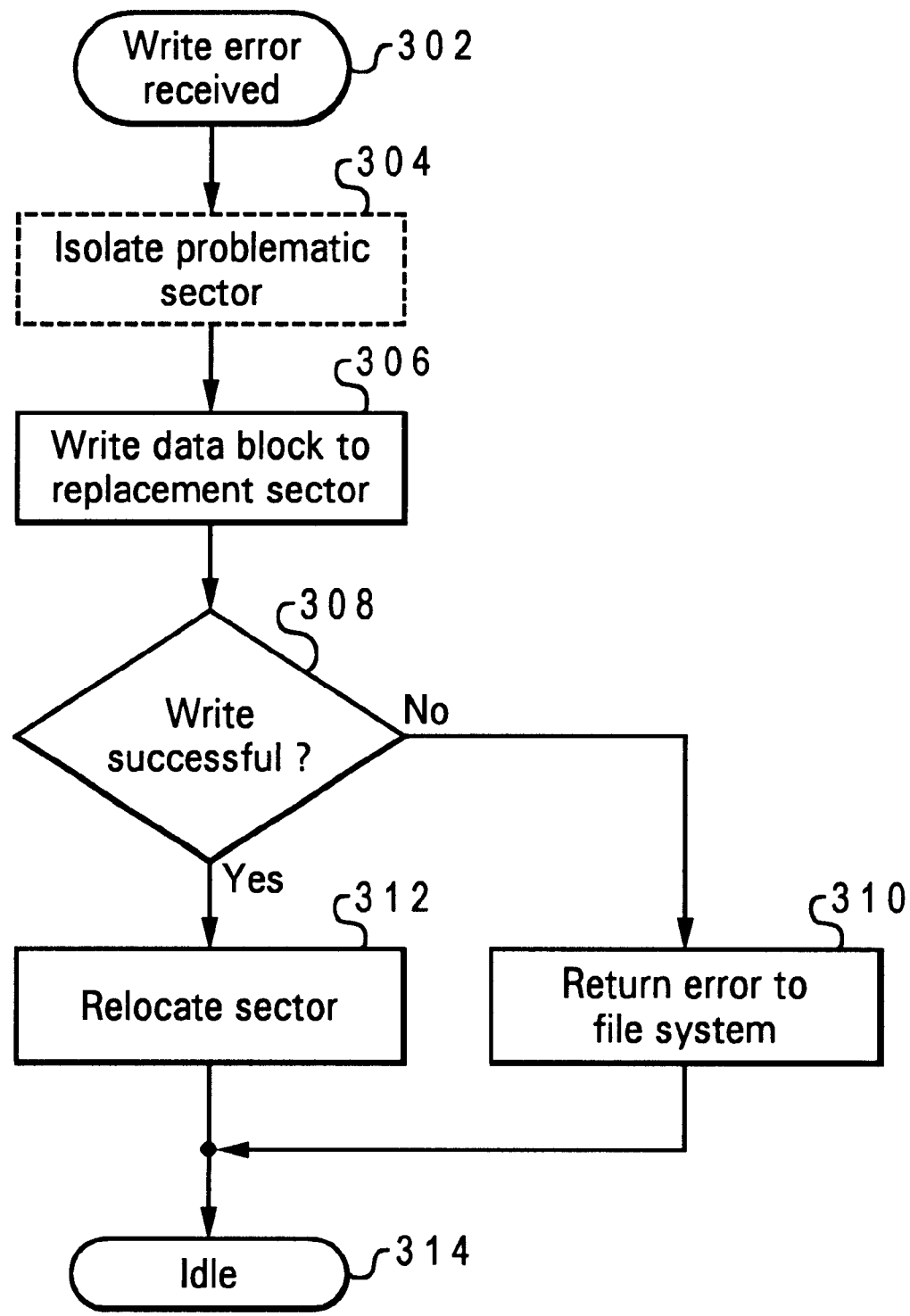
FIG. 3 depicts a high level flow chart for a process of distinguishing true write faults caused by unreliable disk sectors from other write errors in accordance with a preferred embodiment of the present invention.

With reference now to FIG. 3, a high level flow chart for a process of distinguishing true write faults caused by unreliable disk sectors from other write errors in accordance with a preferred embodiment of the present invention is depicted. The process begins at step 302, which depicts receiving a write error within an operating system device manager in response to an attempt to write to a disk controlled by the device manager.

The process next optionally passes to step 304, which illustrates isolating one or more problematic sectors, if necessary, within a group of sectors which were being written to when the write error was received. Sectors may be isolated by individually attempting to write to each sector within the group, and noting all sectors which return write errors. If only one sector was being written to when the error message was received, this step may be skipped. Furthermore, if only one sector was being written to, or the problematic sector(s) within a group is identifier, and the write error may confidently be interpreted as a true write fault (e.g., the specification for the write error messages returned by a device driver for the drive make and model are known), the process may skip directly to relocation of the sector.

In general, however, the process next passes to step 306, which depicts testing the write error returned by write the data block which was written to the problematic sector when the write error was returned to a reserved replacement sector. The process then passes to step 308 which illustrates a determination of whether the write to the replacement sector was successful.

If an error message was returned for the write to the replacement sector, the process proceeds to step 310, which depicts returning an appropriate error message to the file system which issued the write request. The write error message is treated as accurately identifying the status of the disk.

Referring back to step 308, if no error message was returned for the write to the replacement sector, the process proceeds instead to step 312, which illustrates completing relocation of the sector to which the data block was originally being written to the replacement sector by mapping the LBN for the data sector to the LBN for the replacement sector. The original data sector may also be marked as bad.

From either of steps 310 or 312, the process next passes to step 314, which depicts the process becoming idle until the next write error is encountered during a write to a disk. If multiple problematic sectors were located in optional step 304, however, the process would repeat steps 306 through 312 for each sector identified as causing a write error before becoming idle.

The present invention allows true write faults caused by disk media defects to be distinguished from other write errors despite inconsistent and often uninformative use of write error messages within device drivers produced by various disk drive vendors. An important aspect of the present invention is that it may be implemented within an operating system component, employing replacement sectors reserved by the operating system. This allows consistent handling of unreliable blocks regardless of the disk media or the capabilities of a disk drive which are involved.

Figure 4:
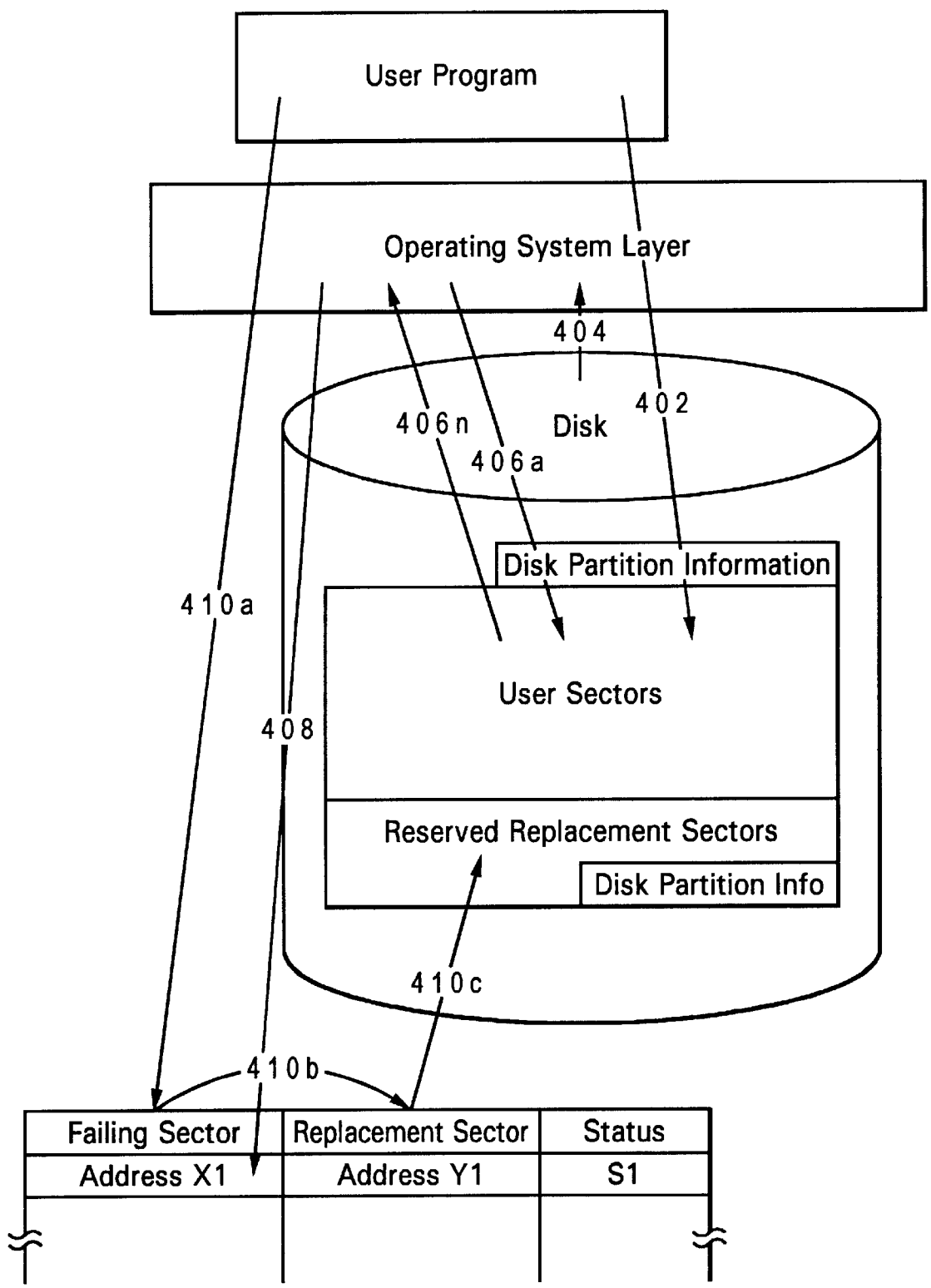
FIG. 4 is a data flow diagram for a process of detecting write errors and preserving user data despite failure of a disk to report write errors in accordance with a preferred embodiment of the present invention.

Referring to FIG. 4, a data flow diagram for a process of detecting write errors and preserving user data despite failure of a disk to report write errors in accordance with a preferred embodiment of the present invention is illustrated. FIG. 4 is a data flow diagram for a process of bad block relocation by an operating system.

When an operating system in accordance with the present invention is installed on a data processing system, and also at later times such as when a disk is added to the data processing system, the user is given the opportunity to create new data volumes which reside on disks within the system. A utility program allowing the user to enter information about the new volume creates the volumes within one or more partitions on a disk.

One volume feature which a user may specify is support, within the operating system, for relocation of bad blocks detected on disk media. When this feature is selected for a volume, the utility program will create an anchor block on the disk at a known location, such as at the very end of each partition making up the volume. The anchor block contains the addresses on the disk for a group of replacement sectors for that partition, reserved by the operating system. A table of addresses or a sized contiguous group of addresses starting at a known location, together with the number of replacement sectors reserved by the operating system, is stored in the anchor block.

The replacement sectors reserved by the operating system are invisible to the user, and cannot be utilized directly by the user. Prior to finishing creation of the volume, all replacement sectors are tested by the operating system to insure that, at least initially, these replacement sectors are good. During operation, the reserved replacement sectors are employed by the operating system to relocate failing user sectors.

FIG. 4 illustrates the flow of data and control for an operating system process of sector replacement on failing disk operations. A user program issues a disk access 402 to a sector or block of sectors within the user area of a disk partition. The disk drive returns an error 404 to the operating system on the attempted disk access.

If necessary, the operating system individually accesses 406a the sectors which were being accessed when the error was returned, monitoring any errors returned 406n for individual sectors to identify failing sectors within the group. The operating system thereby identifies failing sectors within the group of sectors. Alternatively, if only one sector was being written when the error was returned, these steps may be skipped.

For each failing sector identified, the operating system creates an entry 408 within a mapping table to provide a pretested, reserved replacement sector for subsequent storage of data directed to the failing sector. The entry created will include the address of the failing sector, a corresponding address of the replacement sector designated to substitute for the failing sector, and status information regarding the data within the replacement sector.

Subsequent disk accesses 410a to the failing sector result in a lookup 410b in the mapping table and are then directed 410c to the replacement sector. In this manner, the failing sector is relocated to a reserved replacement sector by the operating system, preferably with no loss of user data. This may be performed on top of, or in addition to, any data relocation performed by a disk drive upon detection of bad sectors.

Since there is no standardized set of error codes for device driver to use for reporting errors to the operating system, the operating system must analyze the error returned by the disk drive through the adapter device driver, and must be able to ascertain what constitutes a recoverable error situation using some means other than the error codes. The drive's ability to store data, indicating that it is operational, is determined by attempting to store data to the drive. By writing the user data to one of the reserved sectors, two goals are accomplished at once: the drive is shown to be operational (or not) and the user data is safely located for future use in a replacement sector, to which the bad sector may be readily mapped. The error reporting mechanism thus is used only as a trigger for sector relocation without using any inherent meanings embedded in the error codes returned.

It is important to note that while the present invention has been described in the context of a fully functional data processing system and/or network, those skilled in the art will appreciate that the mechanism of the present invention is capable of being distributed in the form of a computer usable medium of instructions in a variety of forms, and that the present invention applies equally regardless of the particular type of signal bearing medium used to actually carry out the distribution. Examples of computer usable mediums include: nonvolatile, hard-coded type mediums such as read only memories (ROMs) or erasable, electrically programmable read only memories (EEPROMs), recordable type mediums such as floppy disks, hard disk drives and CD-ROMs, and transmission type mediums such as digital and analog communication links. While the invention has been particularly shown and described with reference to a preferred embodiment, it will be understood by those skilled in the art that various changes in form and detail may be made therein without departing from the spirit and scope of the invention.

What is claimed is:

1. A method of distinguishing write faults resulting from sector failures from other write errors, comprising:
    attempting to write a data block to a data sector;
    responsive to receiving a write error for the attempted write of the data block to the data sector, writing the data block to a replacement sector; and
    determining whether the write error resulted from failure of the disk sector utilizing the write of the data block to the replacement sector.

2. The method of claim 1, wherein the step of attempting to write a data block to a data sector further comprises:
    attempting to write a plurality of data blocks to corresponding data sectors; and
    responsive to receiving a write error for the attempted write of the data blocks, attempting to write each data block within the plurality of data blocks individually.

3. The method of claim 1, wherein the step of writing the data block to a replacement sector further comprises:
    writing the data block to a pretested replacement sector reserved by an operating system for a host including a disk drive on which the data sector is located.

4. The method of claim 1, wherein the step of writing the data block to a replacement sector further comprises:
    issuing, from an operating system component within a host including a disk drive on which the data sector is located, a write request to write the data block to the replacement sector.

5. The method of claim 1, wherein the step of determining whether the write error resulted from failure of the disk sector utilizing the write of the data block to the replacement sector further comprises:
    determining whether the write of the data block to the replacement sector was successful.

6. The method of claim 5, further comprising:
    responsive to determining that the write of the data block to the replacement sector was unsuccessful, reporting an error to a file system issuing a write request to write the data block to the data sector.

7. The method of claim 5, further comprising:
    responsive to determining that the write of the data block to the replacement sector was successful, relocating the data sector to the replacement sector.

8. The method of claim 7, wherein the step of relocating the data sector to the replacement sector further comprises:
    mapping a logical block number for the data sector to a logical block number for the replacement sector.

9. The method of claim 8, wherein the step of mapping a logical block number for the data sector to a logical block number for the replacement sector further comprises:
    creating an entry within a defect map table maintained by an operating system component managing a disk including the data sector and examined by the operating system component for each subsequent disk access.

10. A system for distinguishing write faults resulting from sector failures from other write errors, comprising:
    a disk storage device; and
    a processor coupled to the disk storage device and executing a disk access process including:
        attempting to write a data block to a data sector;
        responsive to receiving a write error for the attempted write of the data block to the data sector, writing the data block to a replacement sector; and
        determining whether the write error resulted from failure of the disk sector utilizing the write of the data block to the replacement sector.

11. The system of claim 10, wherein the disk access process attempts to write a data block to a data sector by:
    attempting to write a plurality of data blocks to corresponding data sectors; and
    responsive to receiving a write error for the attempted write of the data blocks, attempting to write each data block within the plurality of data blocks individually.

12. The system of claim 10, wherein the disk access process writes the data block to a replacement sector by writing the data block to a pretested replacement sector reserved by an operating system for a host including a disk drive on which the data sector is located.

13. The system of claim 10, wherein the disk access process is performed by an operating system component within a host including a disk drive on which the data sector is located.

14. The system of claim 10, wherein the disk access process determines whether the write error resulted from failure of the disk sector utilizing the write of the data block to the replacement sector by determining whether the write of the data block to the replacement sector was successful.

15. The system of claim 14, wherein the disk access process, responsive to determining that the write of the data block to the replacement sector was unsuccessful, reports an error to a file system issuing a write request to write the data block to the data sector.

16. The system of claim 14, wherein the disk access process, responsive to determining that the write of the data block to the replacement sector was successful, relocates the data sector to the replacement sector.

17. The system of claim 16, wherein the disk access process relocates the data sector to the replacement sector by mapping a logical block number for the data sector to a logical block number for the replacement sector.

18. The system of claim 17, wherein the disk access process maps a logical block number for the data sector to a logical block number for the replacement sector by creating an entry within a defect map table maintained by an operating system component managing a disk including the data sector and examined by the operating system component for each subsequent disk access.

* * * * *